United States Patent [19]

Breitbach

[11] Patent Number: 5,102,541
[45] Date of Patent: Apr. 7, 1992

[54] SUPPORTING TUBE CONSTRUCTION FOR FILTER MODULES

[75] Inventor: Peter P. Breitbach, Bretzenheim, Fed. Rep. of Germany

[73] Assignee: Seitz-Filtewerke Theo & Geo Seitz GmbH & Co. KG, Bad Kreuznach, Fed. Rep. of Germany

[21] Appl. No.: 654,981

[22] Filed: Feb. 13, 1991

[30] Foreign Application Priority Data

Aug. 25, 1990 [DE] Fed. Rep. of Germany ....... 4026934

[51] Int. Cl.⁵ ............................................. B01D 27/08
[52] U.S. Cl. ..................................... 210/232; 210/350; 210/455; 210/486; 210/493.2; 210/497.01; 55/475
[58] Field of Search ............... 210/232, 346, 350, 455, 210/493.1, 493.2, 493.5, 486, 497.01; 55/475

[56] References Cited

U.S. PATENT DOCUMENTS 3,259,248  7/1966  Wiegand ............................ 210/487
3,592,766  7/1971  Kudlaty ............................. 210/232
4,863,598  9/1989  Drori ................................. 210/346
4,929,354  5/1990  Meyering et al. ................ 210/493.2

FOREIGN PATENT DOCUMENTS 3741552  6/1989  Fed. Rep. of Germany .
 991301  5/1965  United Kingdom .
1126229  9/1968  United Kingdom .
1330641  9/1973  United Kingdom .
2218921 11/1989  United Kingdom .

Primary Examiner—Robert A. Dawson
Assistant Examiner—Wanda L. Millard
Attorney, Agent, or Firm—H. Gibner Lehmann; K. Gibner Lehmann

[57] ABSTRACT

To simplify the assembly of filter modules 10, the supporting tube 1 which carries the filter cells 9 is constituted in two pieces. Both the upper tube piece 4 and the lower tube piece 5 contain locking elements 7 which are received in correspondingly large recesses 8, thereby making possible a safe interlock as well as a relative axial movability of the tube pieces 4 and 5.

26 Claims, 4 Drawing Sheets

SUPPORTING TUBE CONSTRUCTION FOR FILTER MODULES

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

CROSS REFERENCES TO RELATED APPLICATIONS

The present application claims priority under 35 USC 119 of West German Application No. P 40 26 934.5 filed Aug. 25, 1990.

BACKGROUND OF THE INVENTION

FIELD OF THE INVENTION

The present invention relates to filter modules or cartridges such as are used in devices intended to filter or clean liquids that circulate in various types of equipment, and more particularly in the supporting tubes which carry the filter elements or cells of these cartridges.

DESCRIPTION OF THE RELATED ART INCLUDING INFORMATION DISCLOSED UNDER 37 CFR §§1.97-1.99

To enable these supporting tubes as they are provided with filter cells, to be assembled into the filtering equipment or to be connected to other supporting tubes carrying filter cells, appropriate adapters must be attached to the ends of each supporting tube.

According to DE-OS 37 41 552, the filter cells as shown therein are fastened first to the single-piece supporting tube. The filter cells are then compressed and the adapters attached to both ends of the supporting tube. This has the extreme disadvantage that the adapters have to be welded to the supporting tube while the filter cells are in the compressed state.

The use of two pieces of tube which must be joined to each other later to produce a single longer tube could be considered disadvantageous, as opposed to the production of a single component, as known from DE-OS 37 41 552.

SUMMARY OF THE INVENTION

According to the present invention, however, the supporting tube is constructed as a composite assemblage, advantageously of two fractional tube pieces, and as provided by the invention it has turned out that, in such a two-piece fractional tube design, the adapters to be attached to the ends can already be attached to the respective fractional tube piece ends prior to the assembly of the filter module. Consequently, the possibility now exists, by the invention, to mold the respective adapters integrally onto the fractional tube pieces. This obviates having to produce separate adapters which otherwise have to be fused on in an additional operation.

When assembling a filter module according to the invention, it has proved to be advantageous that the filter cells can be attached to the fractional tube pieces first, whereupon the two fractional tube pieces can then be joined together.

So that the fractional tube pieces carrying the filter cells can be jointed together in a simple manner, as provided by the invention, they preferably have, at their end opposite the adapter, locking elements which interlock when interconnecting the tube pieces. Therefore, the two fractional tube pieces need only be pushed against each other until the locking elements engage each other.

Since the filter cells are compressed elastically during the assembly of the filter module, which leads to considerable restoring forces after relief, the locking elements according to the invention are of appropriately rugged design.

In order to reduce these restoring forces which, after all, can be as high as 1.3 t. or times, there are provided, in the locking area of each of the fractional tube pieces, recesses which are engaged by the locking elements of the respective other tube piece. These recesses are arranged so that, in the assembly of the filter module, the two fractional tube pieces can be pushed beyond their intended end position relative to each other. This, in turn, offers the advantage that the locking elements only need absorb by far weaker forces. The material thickness of the entire composite supporting tube can also be reduced accordingly.

Another advantage of the invention is apparent in particular when several modules are stacked on top of each other and compressed. Drawbars and springs holding the modules together are provided for this purpose. In one-piece supporting tubes used so far it could happen that, due to the softening of the materials, the individual filter cells no longer become stacked on top of each other in sealing fashion during operation. However, due to the recess provided according to the invention for the locking elements to engage, a certain axial mobility of the tube pieces relative to each other is provided so that the spring compressing the modules can continue to compress the supporting tube when the filter cells soften thereby to provide now as before an optimum seal between the filter elements. Beyond this, the possibility exists to improve the sealing action by mechanical retensioning.

The locking elements formed as integral components of the tube piece wall, are formed on its circumference in juxtaposition.

Regarding the structure of the locking elements, it must be insured that, when joining the fractional tube pieces together, the locking elements cannot escape radially outward on account of the filter cells already attached to the tube pieces. Another point to be watched out for is that, after interconnecting the tube pieces, the locking elements do not project radially inward because the supporting tube must be placed over a tubular sieve whose outside diameter is adapted to the inside diameter of the supporting tube.

Advantageously, the locking elements are of T-shape with a longitudinal stem and a transverse head each, the longitudinal stems running parallel to the tube centerline and the transverse heads being of circular arcuate configurations. Each two neighboring locking elements of one tube piece encompass a recess to seat a locking element of the respective other tube piece.

The axial length of the recesses of the one tube piece is selected so as to match at least the thickness of the transverse heads of the respective other tube piece so that, when plugging the two tube pieces together, they can be pushed into each other beyond their final position by a certain distance. This is also necessary to make possible an axial mobility of the two tube pieces relative to each other later.

The axial length of the recesses should preferably equal twice the thickness of the transverse heads of the locking elements of the respective other tube piece. In order to prevent twisting of the tube pieces relative to each other insofar as possible, the mutual spacing of two transverse heads of one tube piece, as seen in circumferential direction, should equal at least the thickness of the longitudinal stem of the respective other tube piece.

To assure simple plugging together and safe interlocking of the two tube pieces, the locking elements of at least one tube piece are of resilient or spring-elastic design. Since the locking elements cannot expand radially outwardly on account of the filter cells already attached to the tube pieces, it must be made certain that the resilient locking elements can expand radially inwardly. Towards this end, the transverse heads of the radially inwardly escaping locking elements have preferably a slide surface facing obliquely outwardly and interacting with correspondingly inwardly facing slide surfaces of the transverse heads of the respective other tube piece when interconnecting the tube pieces. The inclination of the slide surfaces is preferably 45 degrees.

When interconnecting the tube pieces, the locking elements slide past each other on their slide surfaces until the locking elements have reached their assigned recess in the respective other tube piece. Upon reaching the recess, the locking elements spring back into their initial position so that the inside diameter of the supporting tube has not been reduced after the interconnection of the two tube pieces. It is of particular advantage when joining the two tube pieces together that they be aligned relative to each other so that all locking elements are opposite their respective recesses. Otherwise, twisting the tube pieces relative to each other is necessary after their axial interconnection so that they can assume their end position in the respective recesses.

After the two tube pieces are joined together, the undersides of the locking elements push against each other due to the restoring forces active through the filter cells. The underside of one each transverse head of a locking element can be in contact with two transverse heads of two locking elements of the respective other tube piece.

Other features and advantages will hereinafter appear.

BRIEF DESCRIPTION OF THE DRAWINGS

Embodiment examples of the invention are described below in greater detail with reference to the drawings, in which.

DESCRIPTION OF THE PREFERRED EMBODIMENT

Figure 1:
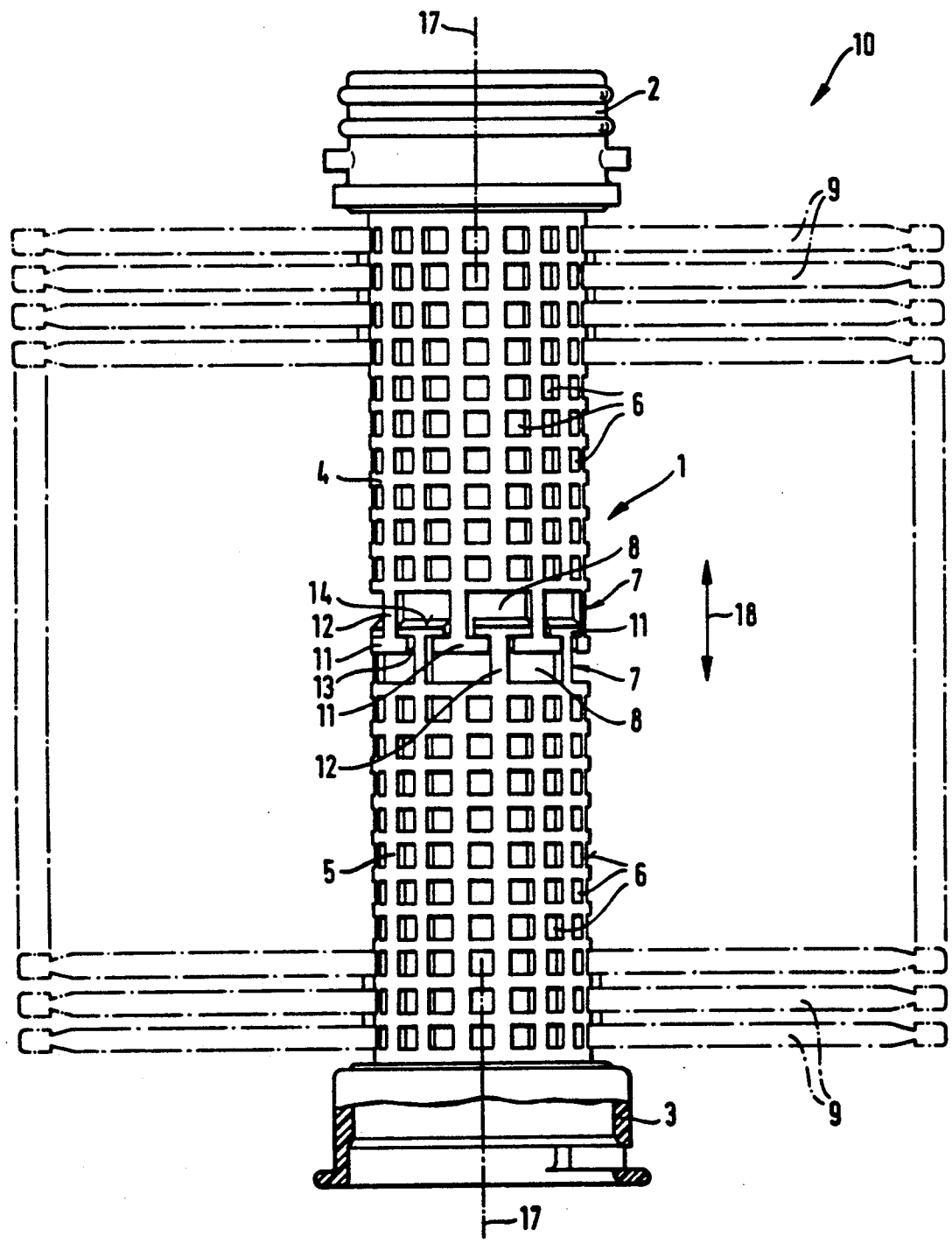
FIG. 1 shows, partly in broken outline, a side view of the filter module after assembly.
Figure 3:
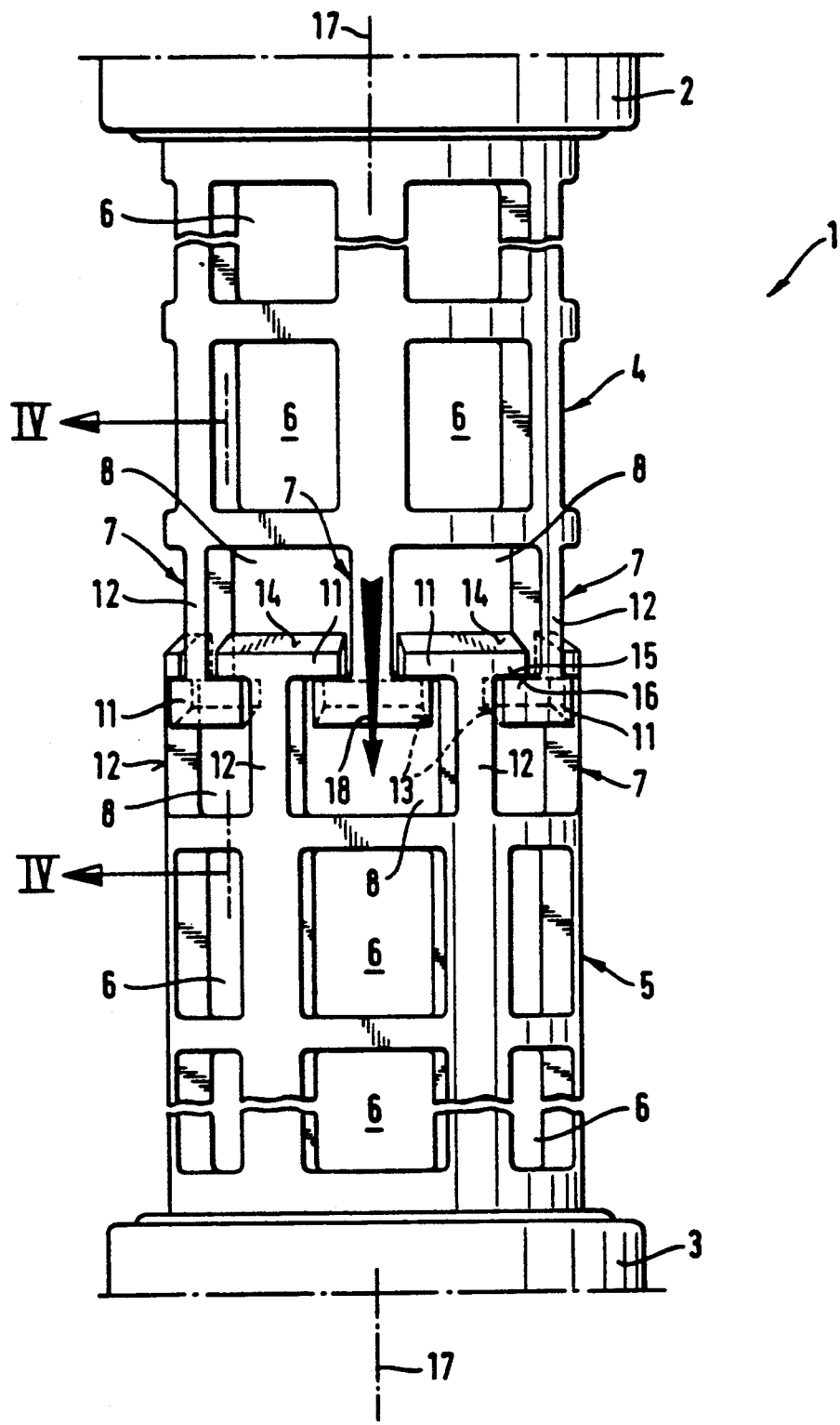
FIG. 3 is a view like that of FIG. 2, showing the locking area of the two tube pieces after their interconnection.

Depicted partly in broken-line section in FIG. 1 is a filter module 10. Adapters 2 and 3 are integrally molded with both ends of a central composite supporting tube assemblage 1. As shown in FIG. 1, two different adapter parts 2, 3 are provided, one (the part 3) being cup shaped, and the other (the part 2) being tubular. Also possible are two identical, annular adapter parts 2', 3', as shown in FIG. 3. The composite supporting tube 1 and the adapters 2, 3 are made of a plastic that is resistant to the medium to be filtered, in particular polyolefin such as polypropylene.

Carried by the composite supporting tube 1, furthermore, are flat circular filter cells 9, built up in multiple layers. The construction of such filter cells 9 is described in DE-OS 37 41 552. For the outflow of the filtrate from the interior of the filter cells 9, the supporting tube is provided with passages 6 through which the filtrate can flow into the interior of the supporting tube 1.

The supporting tube 1 consists of a first tubular piece 4 and a second tubular piece 5, both being of the same length in the construction shown here. But the possibility also exists to construct the two tubular pieces 4 and 5 so as to be different in length.

To interconnect the two tubular pieces 4 and 5, they have at their juxtaposed ends away from the adapters 2, 3 cooperable locking means or elements 7 which interlock when the two tubular pieces 4 and 5 are plugged together.

These locking elements 7 are components of the tube wall and form integral parts of the tubular pieces 4 and 5 equipped with breakthroughs 6. The locking elements 7 are circularly disposed around the axes of the tubular pieces 4 and 5.

Figure 2:
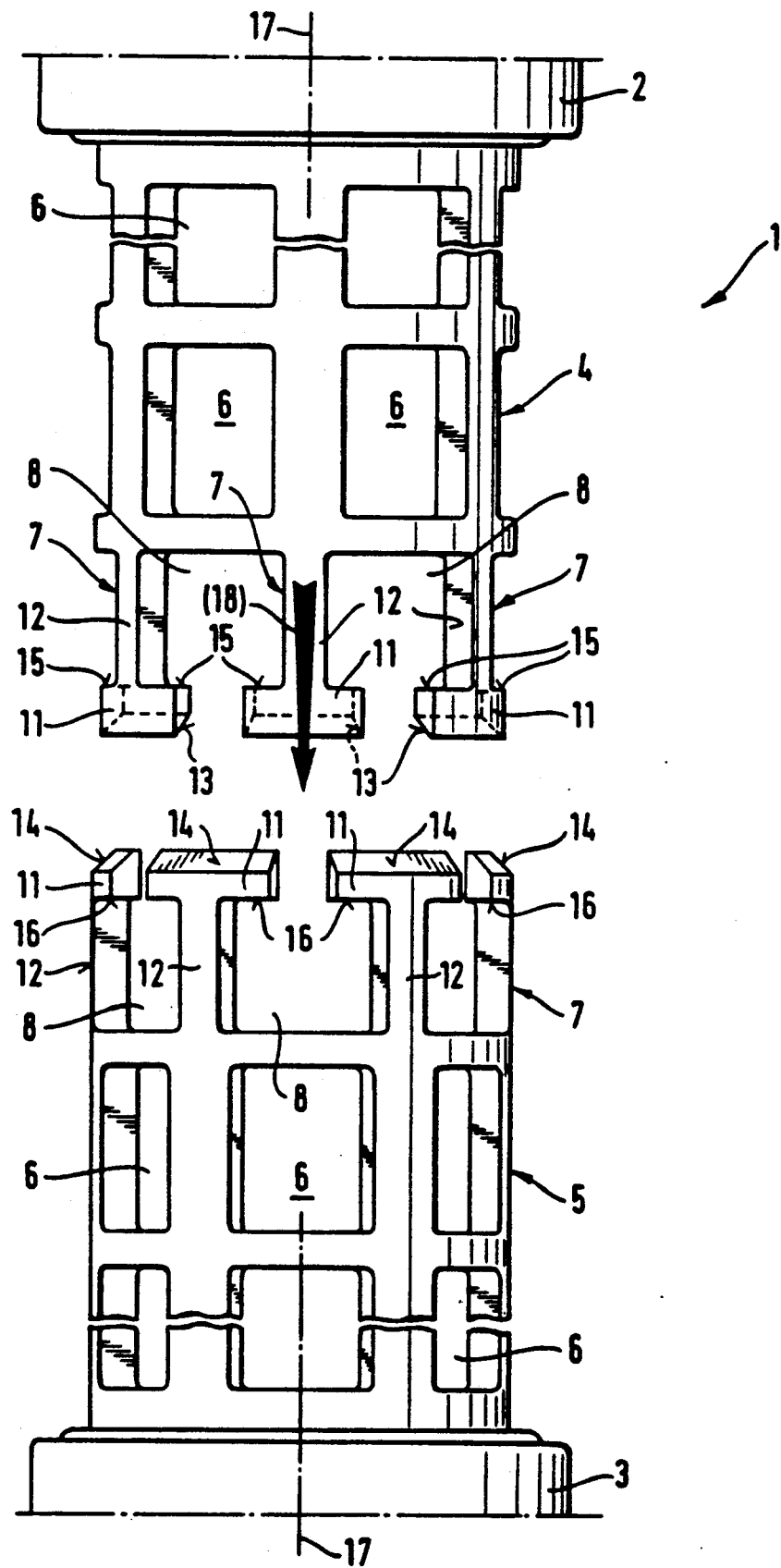
FIG. 2 is a fragmentary side elevational view of the locking area of the tube pieces forming the composite supporting tube, prior to their interconnection.
Figure 4:
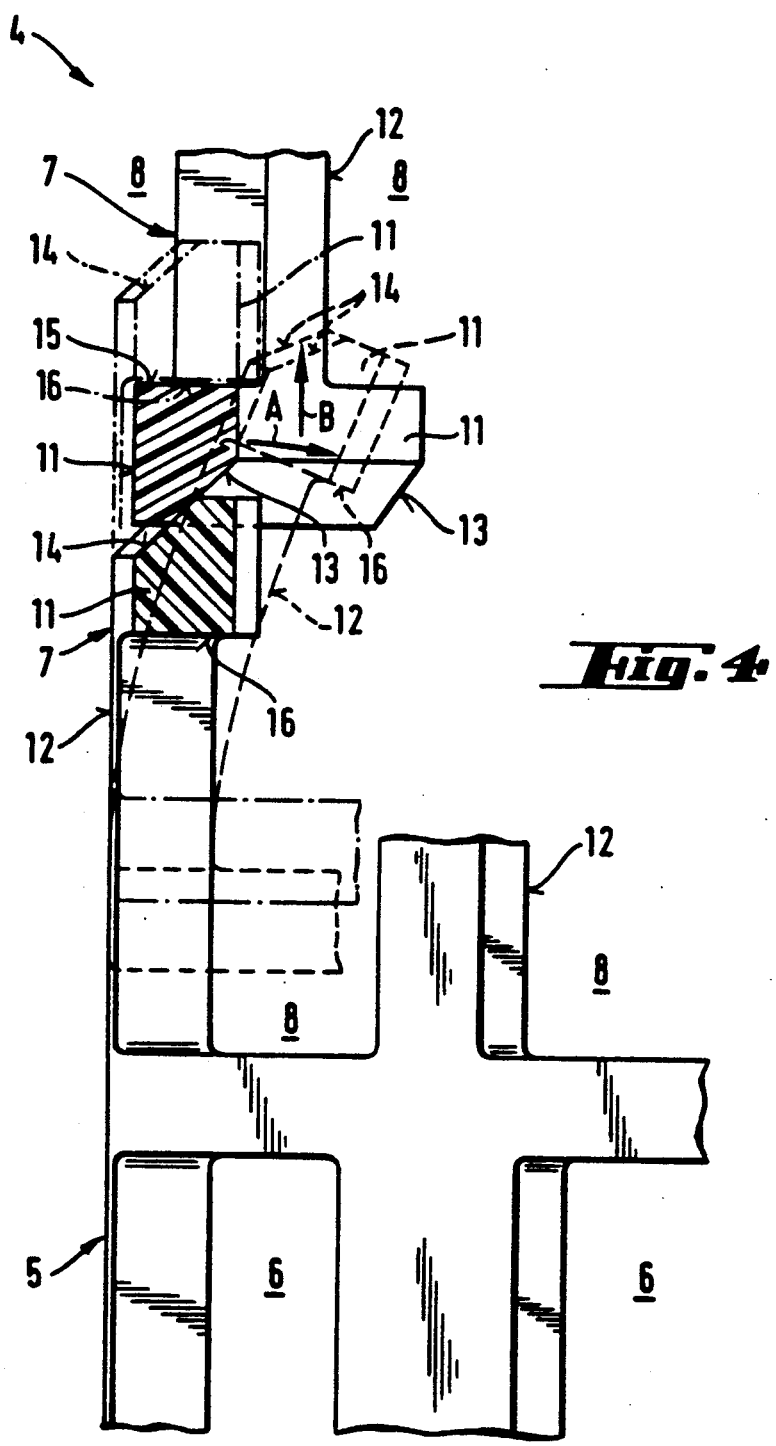
FIG. 4 is a fragmentary enlarged view, partly in section, of two locking elements while the tube pieces are being interconnected.

The structure of the locking elements is shown in detail in FIGS. 2 to 4.

In FIG. 2 are depicted the two end areas of the tubular pieces 4 and 5 in larger scale, prior to the joining of the pieces. The locking elements 7 of both the tubular pieces 4 and 5 are of T-shape, and each has a longitudinal stem 12 and a transverse head 11. The longitudinal stems 12 are aligned parallel to the tube centerline 17 while the transverse heads 11 are of circular or arcuate design, lying together on the circumferential circle of the respective tubular piece 4, 5.

Two neighboring locking elements 7 always encompass one recess 8 between them, which can be engaged by the transverse head 11 of the locking element 7 of the respectively other tube piece. This is illustrated in FIG. 3.

The recesses 8 are larger in axial direction than the thickness of a transverse head 11. In the view shown in FIG. 3, the axial extent of a recess 8 corresponds approximately to three times the thickness of a transverse head 11. This provides for an axial mobility of the two tubular pieces relative to each other in the direction of the arrow 18.

In FIG. 2, the two tubular pieces 4 and 5 are aligned relative to each other so that the mutually opposing locking elements 7 are staggered. This offers the advantage that the two tubular pieces 4 and 5 merely have to be pushed into each other in an axial direction so that the locking elements 7 can engage the recesses 8 respectively assigned to them.

The locking elements 7 of the tubular piece 4 have inwardly facing or camming slide surfaces 13 provided on the transverse heads 11. The transverse heads 11 of the locking elements 7 of the tubular piece 5 have correspondingly inclined slide or camming surfaces 14 facing outward.

The mutual spacing of the transverse heads 11, as viewed in a circumferential direction, is somewhat greater in the view shown in FIG. 3 than the thickness of the longitudinal stems 12. The mutual spacing of two neighboring transverse heads 11 is preferably adapted to the thickness of the longitudinal stem 12 of the engaging locking element 7 of the respective other tubular piece so as to exclude as best as possible a twisting of the tubular pieces 4 and 5.

The interaction of the two slide or camming surfaces 13 and 14 while the two tubular pieces 4 and 5 are joined together is shown in detail in FIG. 4. The inwardly facing slide surface 13 of the locking element 7 of tubular piece 4 rests on the slide surface of the opposite locking element of the tubular piece 5. When both tubular pieces 4 and 5 are pushed together in an axial direction, the locking element 7 escapes inwardly in the direction of the arrow A due to its resilient or spring-elastic design. This makes it possible for the transverse head 11 of the locking element 7 of the tubular piece 5 to slide along the inside of the corresponding locking element of the tubular piece 4 in the direction of the arrow B until the recess 8 disposed above the transverse head 11 is reached. Due to its spring action, the deflected locking element 7 snaps into this recess 8 and forms, together with the transverse head 11 of the locking element 7 of tube piece 4, an interlock in which the respective rear surfaces 15 and 16 of the transverse heads 11 lie on top of each other.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

List of reference numbers

1. Supporting tubular assemblage
2. Adapter
3. Adapter
4. First tubular piece
5. Second tubular piece
6. Passage
7. Locking element
8. Recess
9. Filter cell
10. Filter module
11. Head
12. Stem
13. Camming surface
14. Camming surface
15. Rear surface
16. Rear surface
17. Centerline of the assemblage
18. Arrow direction
A Arrow direction
B Arrow direction

What is claimed is:

1. Central supporting tube, as component for filter modules, designed to accommodate filter cells, with adapters arranged at both ends, characterized in that the entire supporting tube (1) is formed of two tube pieces (4, 5) to which the respective adapter is permanently attached and in that the tubular pieces (4, 5) at their ends opposite the respective adapter (2, 3), have locking elements (7) with recesses (8) engaged by the locking elements (7) of the respective other tube piece (4, 5), said recesses (8) being designed so that the locking elements (7) are movable in an axial direction in the recesses (8).

2. Supporting tube according to claim 1, characterized in that the locking elements (7) of at least one tube piece (4, 5) are of spring-elastic design.

3. Supporting tube according to claim 2, characterized in that the spring-elastic locking elements (7) of one of the two tube pieces (4, 5) are designed so that they yield radially inward when connecting the tube pieces (4, 5).

4. Supporting tube according to claim 3, characterized in that the transverse legs (11) of the locking elements (7) yielding radially inward have a slide surface (14) which points outwards and cooperates with inwardly pointing slide surfaces (13) of the transverse legs (11) of the respective other tube piece (4, 5), during connecting of the tube pieces (4, 5).

5. Supporting tube according to claim 4, characterized in that the inclination of the slide surfaces (13, 14) is 45°.

6. Supporting tube according to claim 1, characterized in that each two adjacent locking elements (7) of the one tubular piece (4, 5) include the recess (8) for the accommodation of a locking element (7) of the respective other tube piece (4, 5).

7. Supporting tube according to claim 6, characterized in that the axial length of the recesses (8) of the one tube piece (4, 5) equals at least the thickness of the transverse leg (11) of the respective other tube piece (4, 5).

8. Supporting tube according to claim 7, characterized in that the axial length of the recesses (8) equals at least twice the greatness of the transverse legs (11).

9. Supporting tube according to claim 1, characterized in that the locking elements are of T-shape with a longitudinal leg (12) and a transverse leg (11) each, the longitudinal legs (12) being arranged parallel to the tube axis (18) and the transverse legs (11) lying generally along an arc of a circle.

10. Supporting tube according to claim 9, characterized in that the mutual spacing of any two transverse legs (11) of the one tube piece (4, 5) in a circumferential direction equals at least the thickness of the longitudinal leg (12) of the respective other tube piece (4, 5).

11. Supporting tube according to claim 1, characterized in that the adapters (2, 3) are molded integrally to the respective tube pieces (4, 5).

12. Supporting tube according to claim 1, characterized in that the locking elements (7), are components of the wall of the tube pieces (4, 5) and are molded along their circumferences in juxtaposed position.

13. Supporting tube according to claim 1, characterized in that the adapters (2, 3) are of identical and annular design.

14. Supporting tube according to claim 1, characterized in that one adapter (2 or 3) is of cup-shape and one adapter (3, or 2) if of tubular design.

15. A supporting tubular assemblage according to claim 1, characterized in that the locking elements (7) comprise integral molded portions of the walls of the tubular pieces (4, 5).

16. A supporting tubular assemblage according to claim 1, characterized in that the locking elements (7) of at least one tubular piece are resilient.

17. A supporting tubular assemblage constituting a central component for a filter module of the type which has adapters disposed on both of its ends, characterized in that said assemblage (1) comprises a first tubular piece (4) and a second tubular piece (5), said pieces being axially aligned with each other and having cooperable interconnectable means at their juxtaposed ends to form a joint between the pieces, said joint providing a degree of axial mobility, the remote ends of the pieces respectively having adapters (2, 3), said cooperable means of the tubular pieces (4, 5) comprising locking elements (7) which engage and lock to each other, and the tubular pieces (4, 5) having at their juxtaposed ends recesses (8) constituting parts of said cooperable means, the recesses of one tubular piece being respectively engaged by locking elements (7) of the respective other tubular piece, said recesses (8) being so constituted that the locking elements (7) are movable therein in an axial direction after they have been received in the recesses.

18. A supporting tubular assemblage according to claim 17, characterized in that each two neighboring locking elements (7) of one of the tubular pieces (4, 5) encompass a recess (8) for receiving a locking element (7) of the respective other tubular piece.

19. A supporting tubular assemblage according to claim 18, characterized in that the axial length of the recesses (8) of the one tubular piece (4, 5) is at least equal to the axial dimensions of the heads (11) of the respective other tubular piece.

20. A supporting tubular assemblage according to claim 19, characterized in that the axial length of the recesses (8) is at least equal to twice the axial dimensions of the heads (11).

21. A supporting tubular assemblage according to claim 19, characterized in that, as viewed in circumferential direction, the mutual spring of two adjoining heads (11) of one tubular piece (4, 5) is at least equal to the width of the stem (12) of the respective other tubular piece.

22. A supporting tubular assemblage constituting a central component for a filter module of the type which has adapters disposed on both of its ends, characterized in that said assemblage (1) comprises a first tubular piece (4) and a second tubular piece (5), said pieces being axially aligned with each other and having cooperable interconnectable means at their juxtaposed ends to form a joint between the pieces, said joint providing a degree of axial mobility, the remote ends of the pieces respectively having adapters (2, 3), said cooperable means of the tubular pieces (4, 5) comprising locking elements (7) which engage and lock to each other, the locking elements (7) of at least one tubular piece being resilient, and in that the resilient locking elements (7) being able to deflect radially inward in response to their engagement with the associated tubular piece.

23. A supporting tubular assemblage according to claim 22, characterized in that the said resilient locking elements have camming surfaces (14) which face obliquely outward and interact with inwardly facing surfaces (13) of the associated tubular piece.

24. A supporting tubular assemblage according to claim 23, characterized in that the said camming surfaces have an inclination of 45 degrees.

25. A supporting tubular assemblage constituting a central component for a filter module of the type which has adapters disposed on both of its ends, characterized in that said assemblage (1) comprises a first tubular piece (4) and a second tubular piece (5), said pieces being axially aligned with each other and having cooperable interconnectable means at their juxtaposed ends to form a joint between the pieces, said joint providing a degree of axial mobility, the remote ends of the pieces respectively having adapters (2, 3), said cooperable means of the tubular pieces (4, 5) comprising locking elements (7) which engage and lock to each other, and the locking elements (7) being T-shaped each with a longitudinal stem (12) and a transverse head (11), the said stems (12) being disposed parallel to the centerline of the assemblage and the heads (11) being shaped as arcs of circles.

26. Filter module, comprising in combination:
a central supporting tube with adapters arranged at both ends, with a multiplicity of circular filter cells which are placed on top of each other as a stack on said supporting tube, said supporting tube being provided with passages and said circular filter cells being kept in an axially compressed state while each forms a mutual seal to the adjacent filter cell, the entire supporting tube (1) being formed of two tube pieces (4, 5) to which the respective adapter is permanently attached, the tube pieces (4, 5) at their ends opposite the respective adapter (2, 3), having locking elements (7) with recesses (8) engaged by the locking elements (7) of the respective other tube piece (4, 5), said recesses (8) being designed so that the locking elements (7) are movable in an axial direction in the recesses (8).

* * * * *